United States Patent [19]

Haag

[11] Patent Number: 4,742,337
[45] Date of Patent: May 3, 1988

[54] LIGHT-CURTAIN AREA SECURITY SYSTEM

[75] Inventor: Güenter Haag, Stuttgart, Fed. Rep. of Germany

[73] Assignee: Telenot Electronic GmbH, Aalen-Hammerstadt, Fed. Rep. of Germany

[21] Appl. No.: 894,870

[22] Filed: Aug. 8, 1986

[30] Foreign Application Priority Data

Aug. 28, 1985 [DE] Fed. Rep. of Germany ....... 3530646

[51] Int. Cl.[4] ............................................ G08B 13/18
[52] U.S. Cl. .................................... 340/556; 250/221; 340/506
[58] Field of Search ....................... 340/556, 557, 506; 324/178, 160; 250/221

[56] References Cited

U.S. PATENT DOCUMENTS

| | | | |
|---|---|---|---|
| 3,746,863 | 7/1973 | Pronovost | 340/566 |
| 4,180,726 | 12/1979 | DeCrescent | 324/178 |
| 4,266,219 | 5/1981 | Foster et al. | 340/506 |
| 4,649,270 | 3/1987 | Goldenberg | 340/566 |

Primary Examiner—Glen R. Swann, III.
Attorney, Agent, or Firm—Hopgood, Calimafde, Kalil, Blaustein & Judlowe

[57] ABSTRACT

An area-security system comprises a transmitting-/receiving strip arranged along one side of an area to be secured and a reflection strip arranged along the other side. The transmitting/receiving strip is divided into transmitting regions and receiving regions, the transmitting regions consisting of a plurality of transmitting elements which are arranged alongside of each other and which are combined in at least two groups, and the receiving regions also consisting of a plurality of receiving elements which are arranged alongside of each other and are also combined in at least two groups. Modulated light from the transmitting elements strikes the receiving regions after being reflected by the reflection strip. A control circuit determines association of different groups of receiving elements with the individual groups of transmitting elements. A multi-channel evaluation, under the synchronizing control of a control circuit, evaluates the signals on the basis of various factors. The area-security system is particularly suitable for penetration-security or for entry-security application, and for the securing or control of machines.

13 Claims, 8 Drawing Sheets

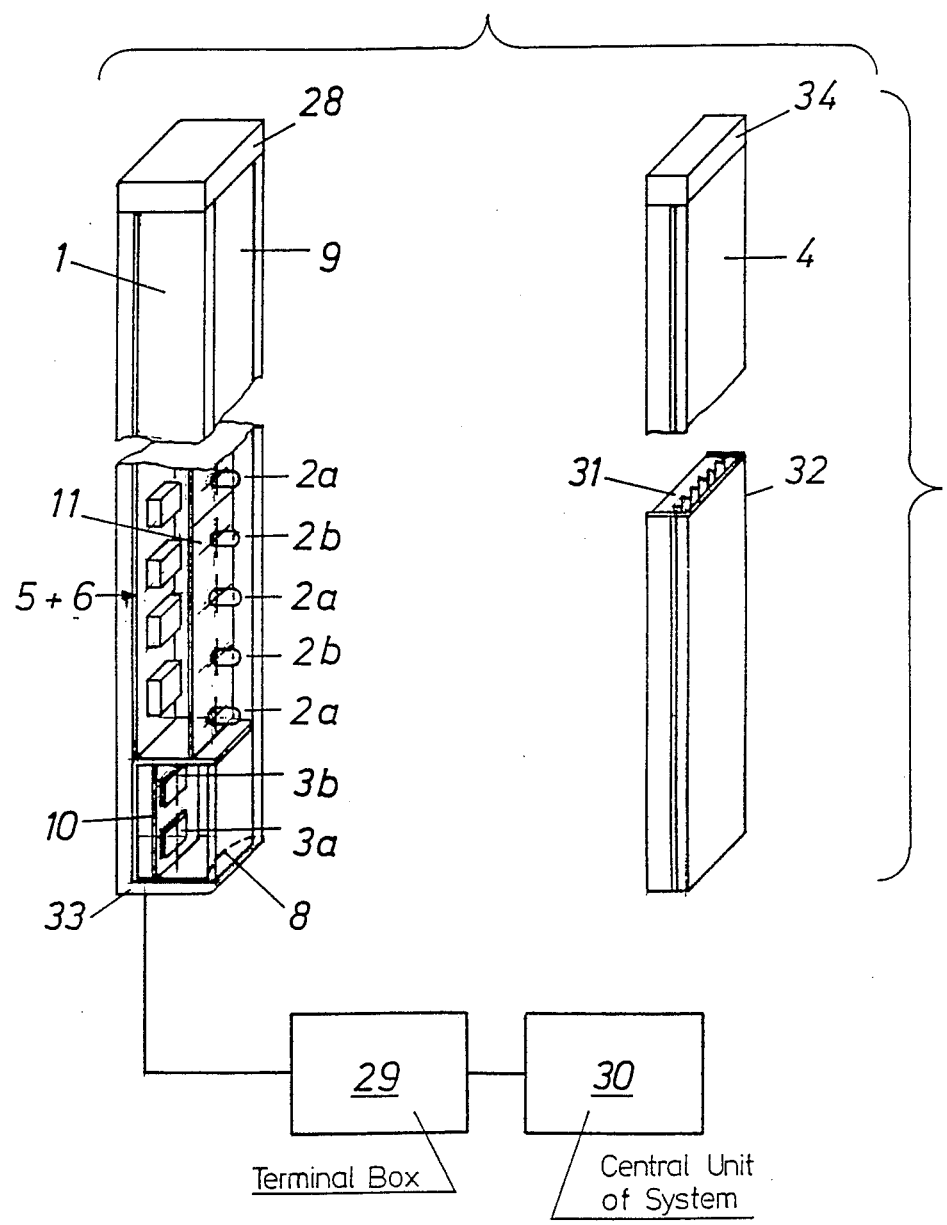

LIGHT-CURTAIN AREA SECURITY SYSTEM

BACKGROUND OF THE INVENTION

The present invention relates to a room or other area-security system wherein one or more transmitting elements and one or more receiving elements are relied upon for detection of intruder presence or motion within the security area.

Area-security systems are known to operate on the basis of different physical principles. Thus, it is known from British Pat. No. 715,444 to monitor an area by using a rotating mirror to move a beam of light over a light-reflecting strip which is arranged along one side of the surface to be monitored. From this strip, the beam of light is passed to a second reflection strip, consisting of triple mirrors, arranged on the other side of the protected area; after reflection, the beam passes back to the rotating mirror and from there to a receiver. This arrangement is very expensive in construction and difficult to adjust and is therefore not suitable as an alarm device for security purposes.

From West German Pat. No. 765,355, an area-security system is known in which reflective strips are arranged on both sides of the area to be monitored, and light coming from a source at one side of the area is fed, after multiple reflections on said strips, to a receiver provided on the other side of the protected area. This system is also very expensive, and it is sensitive to vibration and difficult to adjust, since accurate mirror adjustments are required.

From West German OS No. 3,134,815, an area-security system is known in which a source which emits radiation over its entire length is arranged along one side of the area to be secured, and a reflecting strip is arranged along the other side; a radiation detector is provided at each of the ends of the source of radiation and is connected to an evaluation circuit. This area-security system does not have the aforementioned disadvantages of sensitivity of adjustment and sensitivity to vibration and is simple in construction. Furthermore, it is characterized by a very dense field of radiation and accordingly by a high sensitivity of response. However, its susceptibility to false alarms makes this area-security system of questionable utility in the burglar-alarm field. In order to be able to dependably detect small objects when this area-security system is developed for penetration (intruder-alarm) security, it is necessary to select a very low sensitivity of response (about 1%). Experience has shown that, in this circumstance, local disturbances of the field, as caused for example by insects, are also detected and thus produce false alarms. Further, this known system has no provision for component failure, particularly failure of transmitting and receiving elements, which in the case of this known system leads to reduced reliability of operation of the security system, e.g., resulting from "holes" in the surface to be monitored.

BRIEF STATEMENT OF THE INVENTION

The object of the present invention is to provide an area-security system of the character indicated, while eliminating the above-mentioned disadvantages of the prior art. Particular importance is given to reliability against false alarms, sabotage, as well as insensitivity to adjustment and vibration. The area-security system should consume only a small amount of current and must be easy to set up. The electronic and mechanical construction of the security system must be such that it is suitable for securing areas of the most different dimensions and proportions.

The foregoing object is achieved by providing a transmitting and receiving strip which is subdivided into transmitting regions and receiving regions, distributed along one side of the surface area to be secured. The transmitting regions are established by an arrayed plurality of transmitting elements, arranged alongside of each other and electrically combined into at least two groups; and the receiving regions consist of an arrayed plurality of spaced receiving elements which are electrically combined in at least two groups. In one embodiment, modulated light from the transmitting elements passes to the receiving regions after reflection by a reflection strip formed by an array of parallel prisms distributed along the other side of the protected area. In another embodiment, light from the transmitting elements passes directly to the receiving regions of another transmitting/receiving strip, which, in place of the reflection strip, is arranged along the other side of the protected area. In each embodiment, given groups of receiving elements are associated by a control circuit with the individual groups of transmitting elements, and the signals coming from the receiving elements are evaluated on basis of various factors in a multi-channel evaluation which is coupled with the control circuit.

Diodes which emit light in the infrared, i.e., IRED's, are particularly suitable transmitting elements; they are characterized by very high quantum yield and by long life. The receiving elements are selected in accordance with the emission wavelength of the transmitting elements. Transmitting and receiving elements are arranged in a transmitting/receiving strip which is subdivided into transmitting regions and receiving regions. A low-profile housing of the transmitting/receiving strip also contains the control and evaluation electronics of the security system. Plural transmitting elements of a transmitting region are arranged alongside of each other on a transmitter module. Similarly, plural receiving elements of a receiving region are located alongside each other in a receiver module. Optical components can also be arranged in the receiver module, as for example, a cylindrical lens for optical amplification of signals and, if needed, for improving the signal/noise ratio. In front of all transmitter and receiver modules is a suitable filter, forming part of the housing enclosure of the transmitting/receiving strip. In burglar-alarm applications, an infrared filter is preferred, in order substantially to eliminate the influence of daylight and at the same time to prevent an outsider from viewing the internal structure of the system. By a suitable arrangement of transmitter modules and receiver modules the length of the transmitting/receiving strip can be adapted to specific requirements. The ends of the transmitting/receiving strip are in each case closed by an end cap, and an indication is reported, in the event of unauthorized removal of an end cap.

It is advisable to construct the transmitter modules such that the transmitter elements are subdivided into or serve two groups, the division into groups being so effected that adjacent transmitting elements belong alternatively to one group or to the other. A control circuit excites transmitter elements of the respective groups in alternation, so that the transmitter elements of the currently excited group are simultaneously caused to emit modulated light pulses, to the exclusion of transmitter elements of the other group. In the simplest case, the receiver modules contain two receiving elements, the individual output of each receiving element being fed to a different one of two evaluation channels. The control circuit is so developed that in each case a given group of transmitting elements is associated with a given group of receiving elements. An alarm is given only when an impermissible influence is detected on both evaluation channels. This means that the light paths for at least two adjacent transmitting elements or receiving elements must be interrupted, and this for a given period of time, in order for the alarm criterion to be satisfied. The minimum time of required interruption to produce an alarm is short, being determined by the switch time between the evaluation channels. This feature of the invention provides a high degree of assurance against false alarms. Such local disturbances in the field of light, as may be caused by insects, therefore do not produce a false-alarm condition. This is of decisive importance, particularly for burglar-alarm use of the area-security system of the invention.

In order to be able to recognize attempts at sabotage (as distinguished from recognition of component impairment or failure), as for example where the sabotage involves pasting an opaque cover over a given group of transmitting elements, it is advisable to couple the individual evaluation channels by means of OR-logic circuitry. Similarly, a monitoring of the total intensity of the light pulses received and of the supply voltage is provided. In this way, the result is obtained that attempts at sabotage are recognized by means of suitably modulated external light and that slowly occurring dirt accumulation on optical elements can be recognized and eliminated when a given predetermined threshold value is reached. Such threshold values are presettable to accord with the general security-code regulations of the involved country.

The invention provides automatic adaptation of the area-security system to slowly occurring changes in the environment or to degrading changes in system components by separately summing the signals of the receiving elements belonging to each group, and the control electronics in succession amplifies the separate summation signals of the receiver groups via a common selective amplifier; after such amplification, the control electronics segregates the group signals, and the values of the separated group signals are individually stored in a subsequent sample-and-hold arrangement for one time cycle. Two integrators having different integration times are connected in parallel behind each sample-and-hold arrangement, and the outputs of the integrators are connected to a comparator with adjustable threshold value; in the event of an impermissible influencing of an evaluation channel, the value of the long-time integration can be stored as long as the impermissible influence exists.

The inventive construction provides area-security protection which is insensitive to adjustment and vibration. Furthermore, the electronic development in accordance with the invention requires the system installer merely to set an amplifier level, independently of geometrical conditions of the surface area to be secured. The modular construction of the electronic control circuit and of the evaluation circuit is advantageous for the use of modern technologies (for example, gate arrays and microprocessors). It is thereby possible to keep the current consumption of the security system comparable to that of the previous passive alarm systems. This portends a greater range of use of the security system of the invention.

If first and second transmitting/receiving strips are arranged in confronting opposition along opposite sides of the surface area to be secured, and if modulated light from the transmitting elements on one side is detected and evaluated by receiving elements of the transmitting/receiving strip on the opposite side, then one obtains a reliable and inexpensive system for securing large surface areas. This development of the invention is particularly suitable for use under rough operating conditions, for example, for the securing of open-land areas.

Important fields of use of the new security system reside in their development as alarms in the field of security engineering, as light curtains for the securing or control of machines, and as timing sensors in the case of speed and time measurements.

BRIEF DESCRIPTION OF THE DRAWINGS

The invention will be described in detail for several illustrative embodiments, in conjunction with the accompanying drawings, in which:

FIG. 6 is a simplified fragmentary isometric view of an illustrative structural development of the area-security system of FIG. 1;

DESCRIPTION OF THE PREFERRED EMBODIMENTS

Figure 1:
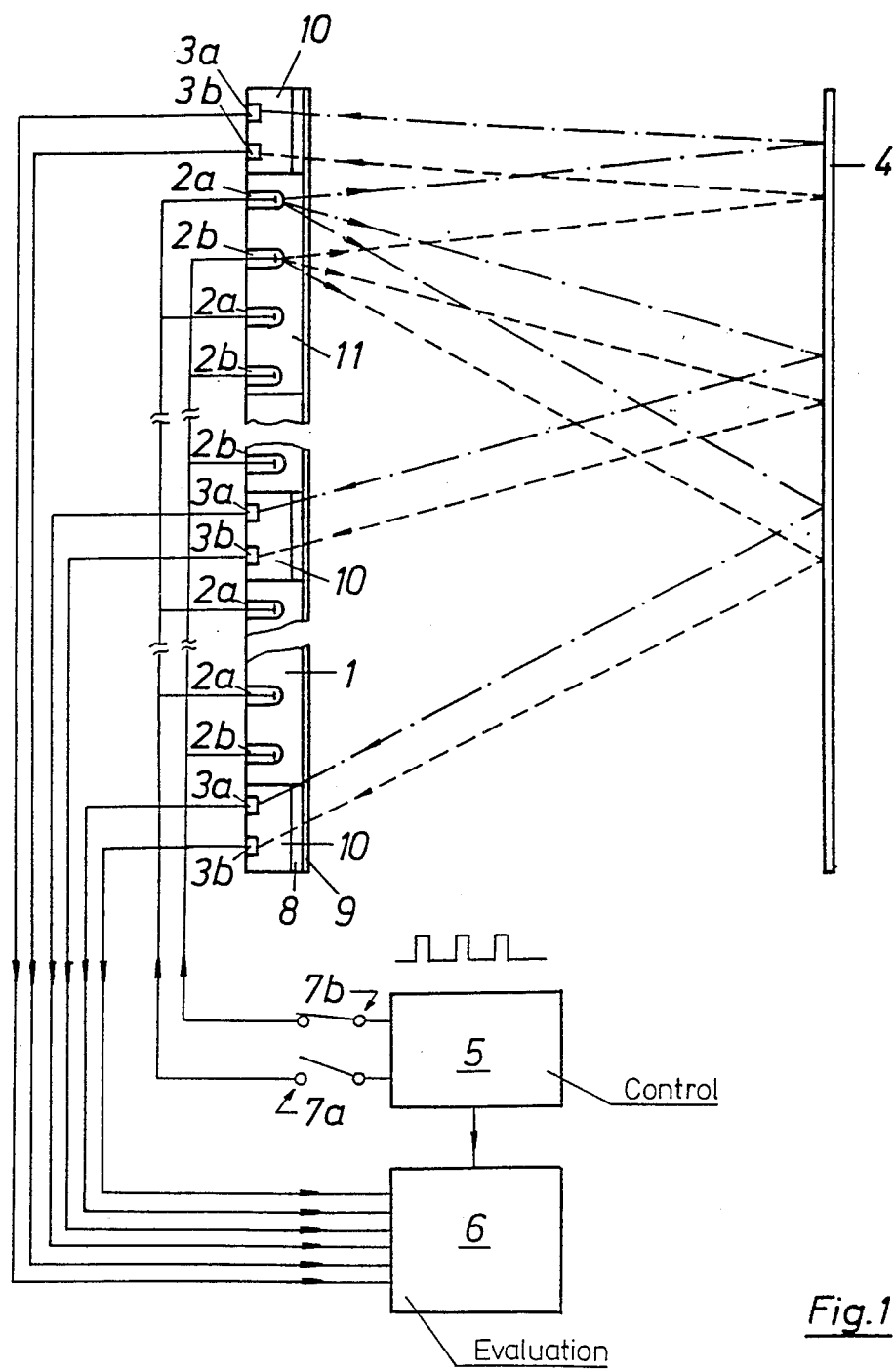
FIG. 1 is a schematic layout of a security system consisting of a transmitting and receiving strip and a reflection strip, for security monitoring of the area between these strips.

In the area-security system of FIG. 1, a transmitting/receiving strip 1 is formed of transmitter modules 11 and receiver modules 10, in interlaced succession. An infrared filter 9 is positioned in front of all modules 11, 10 of the strip 1, to prevent a possible view of the construction of the area-security system, and also substantially to suppress the influence of daylight. Elements 2 transmit in the infrared and are suitably infrared-emitting diodes (IRED's). Each transmitter module 11 comprises a plurality of transmitter elements 2, here shown as two elements (2a, 2b) in each module 11. Of course, a transmitter module can also consist of further transmitting elements (2a, 2b). The corresponding elements 2a of all modules 11 are interconnected as a first group, as are also a second group of corresponding elements 2b of all modules 11. Each receiver module 10 contains two receiving elements 3a, 3b, and their respective signals are fed to an evaluation electronic system 6; a cylindrical lens 8 in front of all receiving elements 3a, 3b improves the optical signal/noise ratio.

Figure 3A:
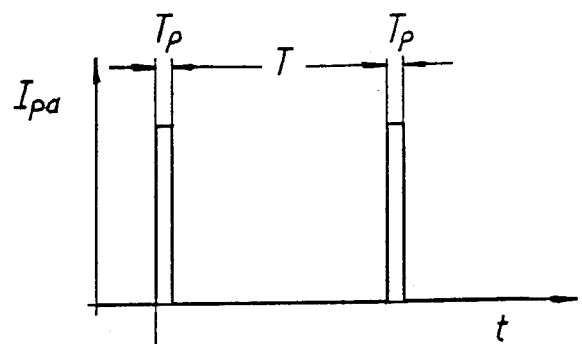
FIGS. 3a and 3b are similar graphs to illustrate time-variation of a control pulse in FIGS. 1 and 2.
Figure 3B:
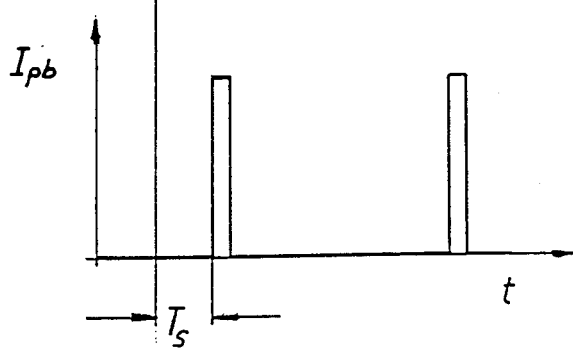

A control circuit 5 and the evaluation circuit 6 are so developed that the receiving elements 3a (3b) are associated with corresponding transmitting elements 2a (2b). The control circuit 5 alternately controls the transmitting elements 2a, 2b via two switch means 7a, 7b, so that the transmitting elements (2a) of one group simultaneously emit suitably modulated infrared light pulses, in alternation with simultaneous emission of suitably modulated infrared pulses from the transmitting elements (2b) of the other group; the controlled succession of these alternating emissions is graphically illustrated by the switch-offset time $T_s$ between those of the element 2a group (FIG. 3a) and those of the element 2b group (FIG. 3b). In FIGS. 3a and 3b, the duration of a transmitting pulse is designated $T_p$, and the time between pairs of transmitting pulses is designated T; the quotient $T_p/T$ establishes average current consumption (duty cycle) of the respective groups of transmitting elements 2a (2b).

FIG. 1 shows, by way of example, a few possible light paths from transmitting elements 2a, 2b to the corresponding receiving elements 3a, 3b. The modulated light emitted by the transmitting elements 2a, 2b passes, after reflection by the reflection strip 4, onto the receiving elements 3a, 3b. The reflection strip 4 is preferably so shaped that it reflects transmitted light in the plane covered by transmitting/receiving strip 1 and reflection strip 4; this can be done, for example, by use of a reflection strip developed from parallel prisms. In order to eliminate local disturbances, an alarm is given off only if there is a masking (i.e., path-interruption) for at least two adjacent transmitting elements 2a and 2b and/or receiving elements 3a and 3b. The minimum time required to trigger the alarm is determined by the switch-offset time $T_s$ between evaluation channels for any given pair of receiving elements 3a, 3b. This relationship, for the case of pairs of transmitting elements (2a, 2b) and pairs of receiving elements (3a, 3b) in plural modules 11, 10 will be seen to provide high assurance against false alarms, throughout the area of system protection; but it will also be understood that other grouped arrangements of multiple elements of the respective modules can achieve a similar result, relying on effectively concurrent interruption of closely adjacent light paths.

Figure 2:
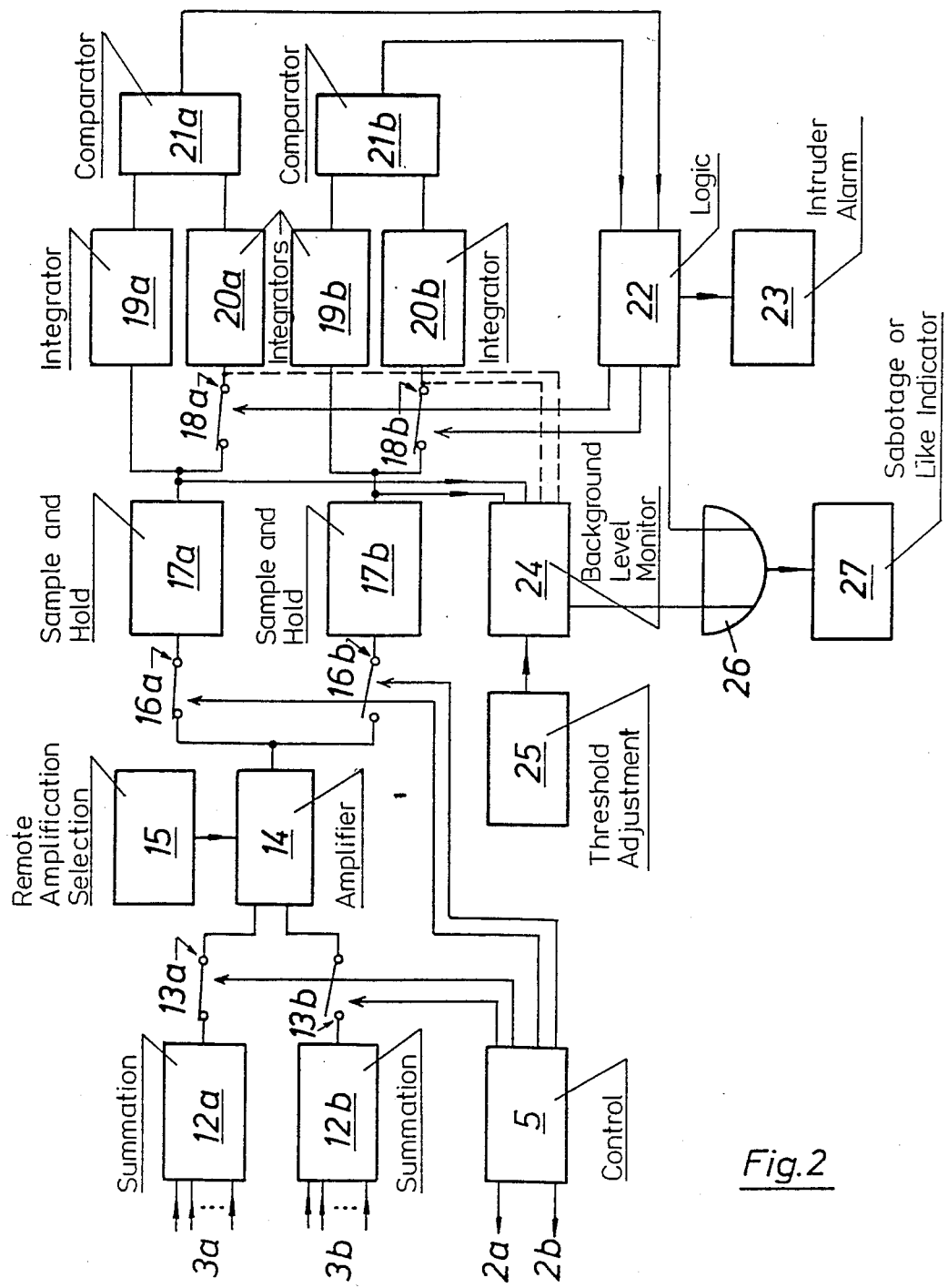
FIG. 2 is an electrical block diagram of a circuit for the control and evaluation functions in the system of FIG. 1.

The circuit of FIG. 2 provides for coordinated control of the transmitting elements 2a, 2b and evaluation of the signals received by the receiving elements 3a, 3b. The signals of the receiving elements 3a (3b), which respectively correspond to transmission-group 2a (2b) emissions, are preamplified, added and filtered in separate electronic units 12a and 12b; thus, only signals whose modulation agrees with the modulation of the transmitting elements 2a are conveyed to unit 12a, and only signals whose modulation agrees with the modulation of transmitting elements 2b are conveyed to unit 12b. Under circuit-5 control, the output signals of electronic units 12a, 12b are alternately fed, via electronic switch elements 13a, 13b to a common amplifier stage 14. Remotely operable means 15 enables the system installer to set the required amplification of amplifier stage 14, i.e., from outside the system, thereby adjusting the output signal of amplifier stage 14 to a predetermined level. By this simple adjustment, the area security can be adapted to the geometry of the area to be secured, and no further adjustments need be made by the installer.

Received signals frequently include superposed disturbances (noise). To reduce or eliminate these undesired disturbances it may be advisable to incorporate a known sharp low-pass filter of non-linear transmission behavior in the amplifier stage 14. Such a filter enables rapid changes in received signals to be transmitted without delay, while disturbances of higher frequency are filtered out, and system insensitivity to undesired disturbance is enhanced.

After amplification at stage 14, the signals of the respective receiver groups 3a, 3b are commutated via electronic switch means 16a, 16b into two separate evaluation channels and are then fed to two sample-and-hold devices 17a, 17b. The switching processes of switch means 13a, 13b and 16a, 16b are so coordinated by control circuit 5 as to avoid the effects of transients; this is explained further in connection with FIG. 4.

Figure 4A:
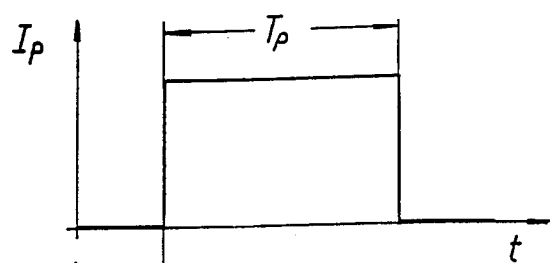
FIGS. 4a to 4d are similar graphs to illustrate time-variation of a control pulse, in context of a timed clipping of the received and amplified signal in FIGS. 1 and 2.
Figure 4B:
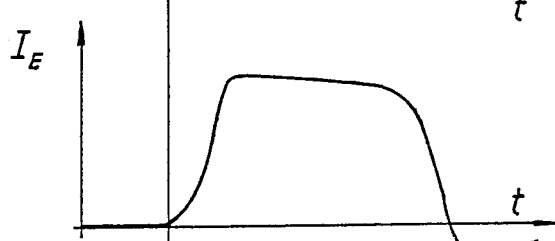
Figure 4C:
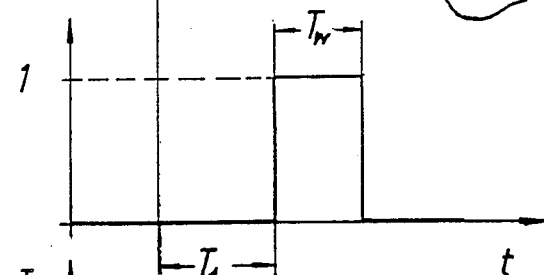
Figure 4D:
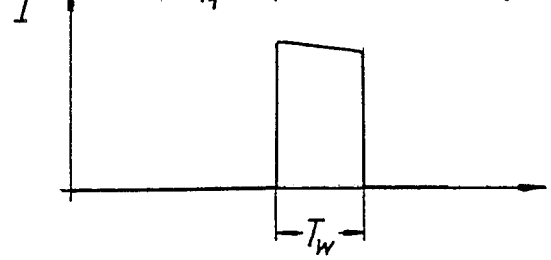

FIG. 4a illustrates a possible time-variation of a control pulse, of pulse duration $T_p$, for one group of transmitting elements, for example, for the group of transmitting elements 2a. FIG. 4b shows the time-varying course of the output signal of amplifier stage 14, as modified by switching transients. To eliminate these transients, the electronic switch means, e.g., switch 16a, remains open during the pulse build-up time $T_1$, and closes only alternately and for a short time $T_w$ during the plateau of the curve of FIG. 4b, the times $T_1$ and $T_w$ being identified in FIG. 4c. The pulses are thus electronically clipped, and they appear as in FIG. 4d, when fed to the subsequent sample-and-hold devices 17a (17b). At the respective outputs of the sample-and-hold devices 17a (17b), the analog value (corresponding to FIG. 4d) of the received and amplified summation signal for one time cycle, is thus always available for further signal processing.

To keep the percentage of false alarms as small as possible, the invention provides compensation for the relatively slow process of dirt accumulation on optical parts, as well as for aging processes of the components within a large predetermined range. This is achieved by providing, behind each of the sample-and-hold devices 17a (17b), integrators 19a, 20a (19b, 20b) which are connected in parallel to an associated comparator 21a (21b) of adjustable threshold value; the integration time of integrators 19a and 19b is relatively short, while that of integrators 20a and 20b is relatively long. The specific threshold value of a comparator 21a (21b) is advisedly so set that the complete covering (obstruction) of a transmitting element 2a or 2b leads to a change in the logic signal at the output of a comparator 21a or 21b respectively. And a simultaneous change of the logic signal at the outputs of both comparators 21a and 21b is used as an alarm criterion. The verification of this alarm criterion is effected in a logic circuit 22, having an output to an alarm device 23.

As has been indicated above, intruder influence on one evaluation channel (i.e., interruption of only a single light path) does not give rise to an alarm. However, to prevent intentional sabotage under such a condition, the logic device 22 is operative upon electronic switch means 18a (18b) to interrupt integration by one of the long-time integrators 20a (20b), the condition for such interruption being the occurrence of a change of logic signal at the output of one of the comparators 21a (21b); concurrently, the instantaneous values at the outputs of integrators 20a and 20b are stored. Since one can assume that continued influence of an evaluation channel over a relatively long period of time (e.g., several hours) represents an attempt at sabotage, a disturbance is reported by a suitable device 27, which is shown to be triggered by logic circuit 22 via an OR-connection 26.

A further increase in security against sabotage is obtained by monitoring the background level and the supply voltage. For this purpose, the levels at the output of the sample-and-hold devices 17a and 17b are fed to a device 24 for monitoring background level, the corresponding threshold values of the background level being set via an adjustment device 25. Slow accumulation of dirt on the optical components results in a slow reduction in the background level. If the dirt accumulation reaches a given threshold value, then, by operation of monitor device 24, via the OR-connection 26, a disturbance is reported at 27. In this way, assurance is also had that the protected security area is fully operable within a wide range of background-level adjustment. Also, by monitoring background level with respect to an upper threshold level, it will be understood that sabotage can be detected even if the saboteur were to direct suitably modulated light onto the receiving elements 3a, 3b; in such case, corresponding threshold values will depend on particular standards code or guidelines for security systems in the involved country.

It is also possible to effect background-level monitoring at other reference points in the circuit. Thus, the output level of amplifier stage 14 can be monitored or, as shown in FIG. 2, the output level behind long-time integrators 20a and 20b can be fed to the device 24 and monitored.

The control and evaluation circuit of FIG. 2 is particularly suitable for electronic implementation using gate arrays and microprocessors, thereby achieving an advantageous reduction in requisite structural size.

Figure 5A:
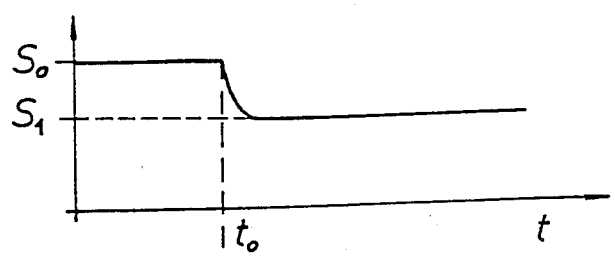
FIGS. 5a to 5d are similar graphs to illustrate time-variation of voltages at different points in the circuit of FIG. 2.
Figure 5B:
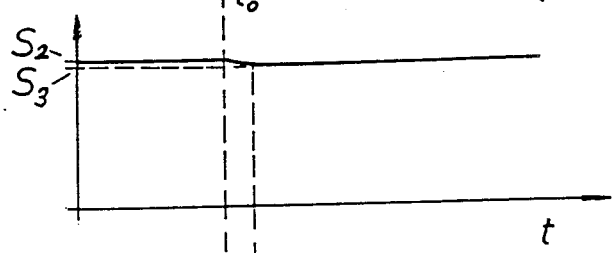
Figure 5C:
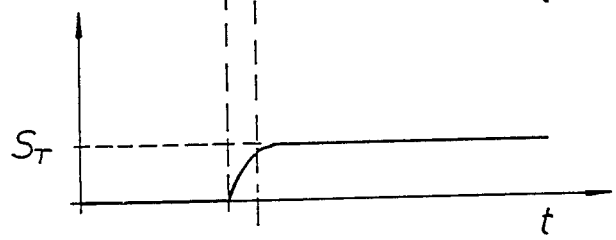
Figure 5D:
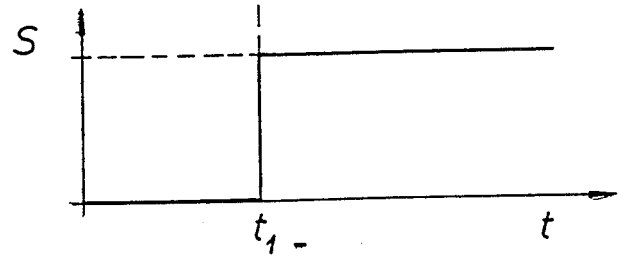

FIGS. 5a to 5d show time-variation of voltages at different points of the circuit of FIG. 2. The covering of a transmitting element by the installer at the time $t_o$ produces, at the output of the applicable integrator having the small time constant (short-time intregrator) 19a (19b), a rapid adjustment from the level $S_o$ to the new level $S_1$, as shown by FIG. 5a. FIG. 5b shows the time variation of the signal output of the applicable integrator having the large time constant (long-time integrator) 20a (20b). The difference between these signals is shown in FIG. 5c. If the difference signal exceeds a given threshold value $S_T$ (see FIG. 5c), then the logic-signal output of the corresponding comparator 21a (21b) changes as shown in FIG. 5d. The change in the logic signal effects an opening of the electronic switch means 18a (18b), as a result of which the long-time integration is interrupted at the time $t_1$, and the instantaneous value at the output of the long-time integrator 20a (20b) is stored. In this way, assurance is had that, in accordance with FIG. 5d, a logic signal is present at the output of the comparator 21a (21b) as long as the disturbing object is within the field of radiation of the area-security system.

FIG. 6 illustrates a structural development of an area-security system consisting of a reflection strip 4 and a transmitting/receiving strip 1, in spaced confronting relation at opposite limits of the area between them. The transmitter modules 11 and receiving modules 10, as well as the control electronics 5 and evaluation electronics 6, are arranged in the transmitting/receiving strip 1. The transmitter modules 11 are formed of two groups of transmitting elements 2a (2b), and each of the receiver modules 10 contains receiving elements 3a (3b) of two groups. A cylindrical lens 8 is provided in front of the receiving elements of each module. The housing 33 of the transmitting/receiving strip 1 is closed at its ends by end caps 28. An infrared filter 9 is also provided, in front of all transmitter and receiver modules 11, 10, to complete the profile of housing 33. The removal of an end cap 28 produces a corresponding report, upon actuation of a contact provided for security against sabotage. The feed wires of the transmitting-/receiving strip 1 are connected by the system-installer, via a terminal box 29 and to the central unit 30 of the alarm system.

The reflection strip 4 consists of a housing 32 in which several reflectors 31 are arranged, and the housing is terminated by suitable reflector end caps 34. The reflectors 31 are shown to comprise a plurality of parallel elongate 90° prisms, so oriented that the reflection of a beam of light preferentially occurs in the protection plane covered by, i.e., defined by and between, the transmitting/receiving strip 1 and the reflection strip 4. The length of the reflectors 31 is adapted to the length of the transmitting module 11.

Figure 7:
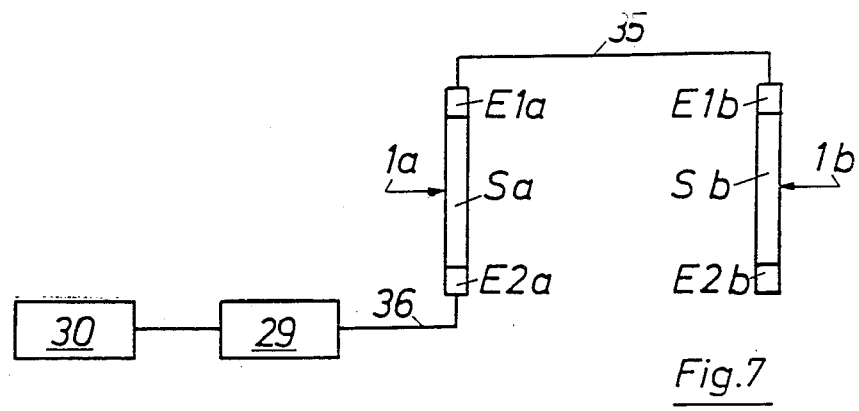
FIG. 7 is a simplified schematic layout of another embodiment of the invention wherein two transmitting and receiving strips are located opposite each other.

FIG. 7 shows an area-security system of the invention wherein two transmitting/receiving strips 1a, 1b are located in opposed confronting relation and are connected to each other by lead wires 35 and, via a terminal box 29, by lead wires 36 to the central board 30 of the alarm system. The individual receiving regions E1a E2a and E1b, E2b, as well as the transmitting regions Sa and Sb of the transmitting/receiving strips 1a and 1b are constructed in the manner already described.

Figure 8:
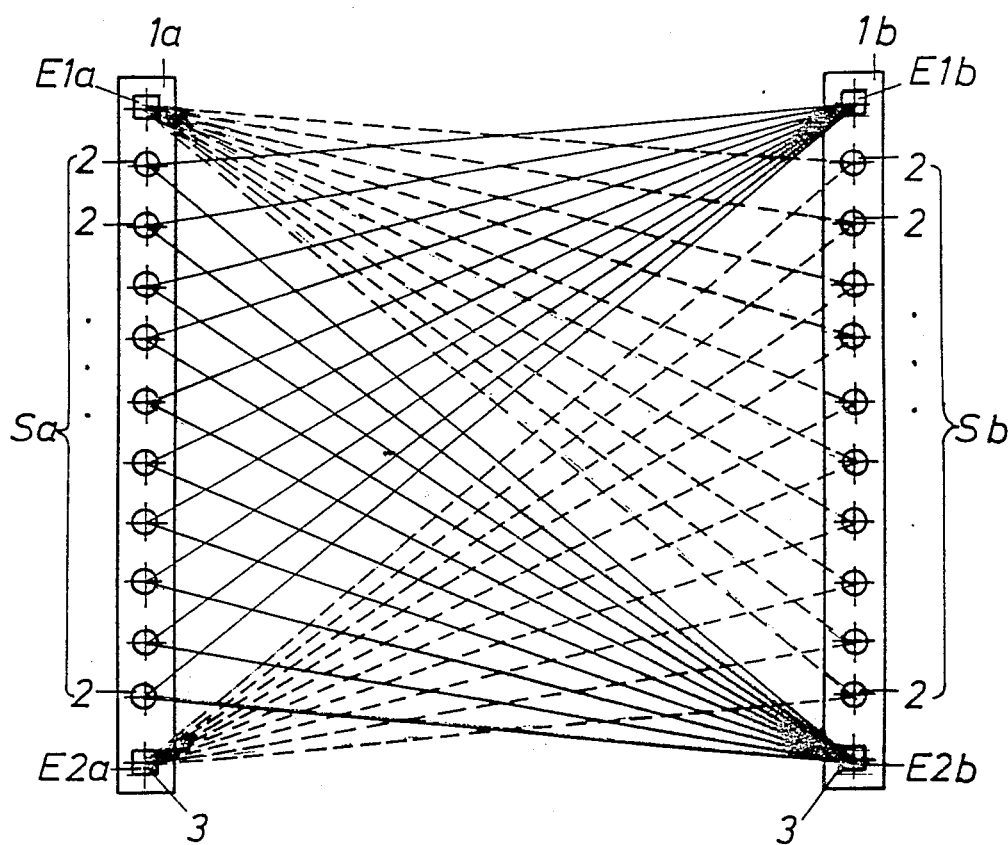
FIG. 8 is a sketch to show area coverage using the embodiment of FIG. 7.

FIG. 8 serves to show the manner of operation of the area-securing system of FIG. 7. The two transmitting-/receiving strips 1a and 1b are divided correspondingly into receiving regions E1a, E2a, E1b, E2b and transmitting regions Sa, Sb. As already mentioned, the transmitting/receiving regions are divided into at least two groups of transmitting elements and receiving elements which are controlled alternately, i.e., in succession. As the alarm criterion, impermissible influence of at least two evaluation channels must occur. The transmitting elements 2 of FIG. 8 are to be considered as belonging to either the first or the second group of the two groups, in the sense that for first-group consideration, infrared light from all transmitting elements 2 of the array Sa is viewed by receiving element E1b, and infrared light from all transmitting elements 2 of the array Sb is concurrently viewed by the diagonally opposite receiving element E2a, the outputs of receiving elements E1b and E2a being summed for first-group signal processing; in alternation, for second-group consideration, infrared light from all transmitting elements 2 of the array Sa is viewed by receiving element E1a, and infrared light from all transmitting elements 2 of the array Sb is concurrently viewed by the remaining diagonally opposite receiving element E2b, the outputs of receiving elements E1a and E2b being summed for second-group signal processing. Area-coverage security is established by the requirement that a change in the logic signal of an evaluation channel is present only when either of the receiving regions (E1b or E2a) and (E1a or E2b) register impermissible changes in signal.

Of course, other logic connections of the evaluation channels and/or associations of receiving and transmitting regions are also conceivable and possible. However, this will not be explained in detail here.

Figure 9:
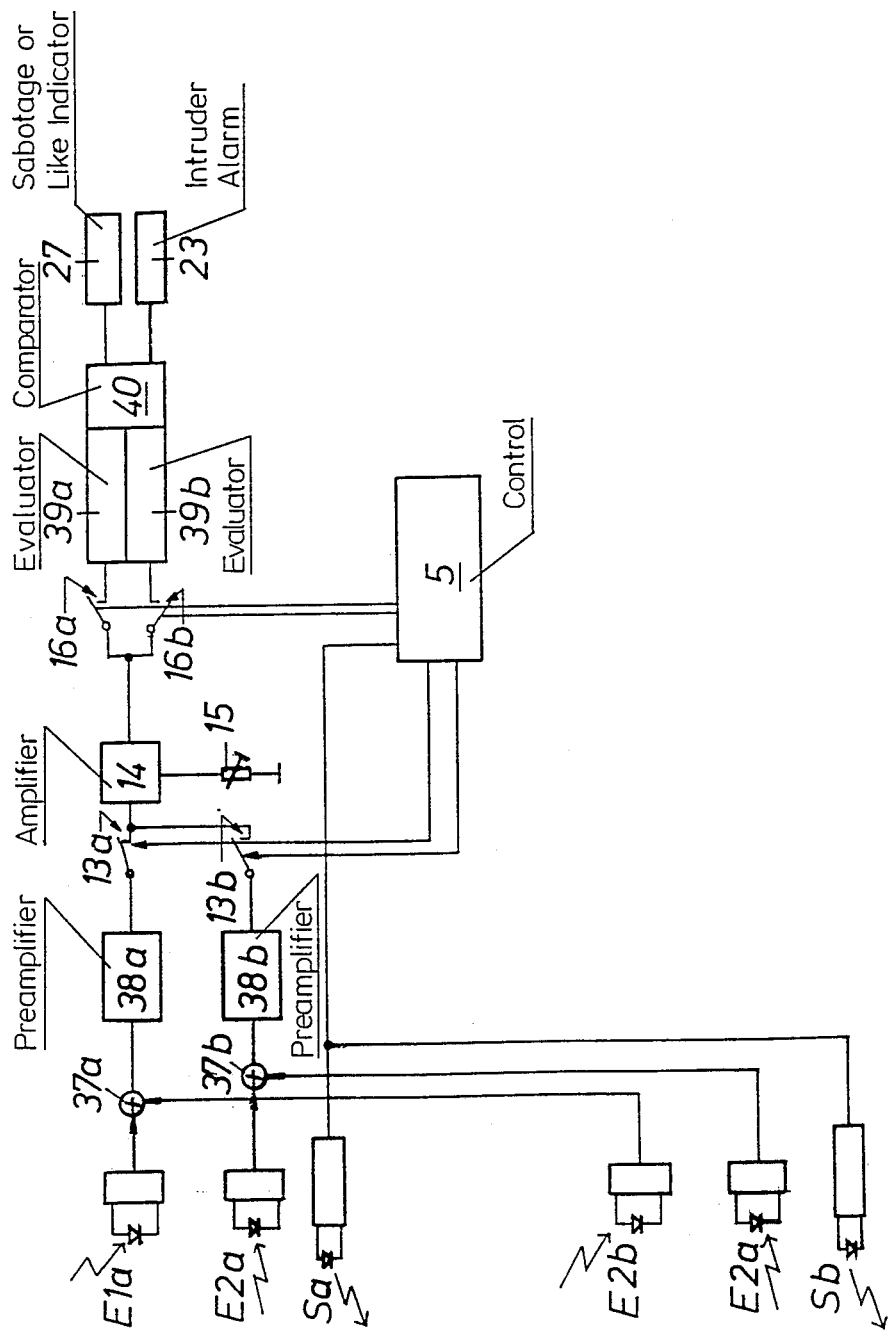
FIG. 9 is a circuit diagram for the area-security system of FIG. 7.

FIG. 9 is a circuit diagram for the area-security system of FIG. 7. The respective signals of the individual receiving regions E1a and E2b of one group, and E2a and E1b of the other group are added at the respective summation devices 37a and 37b, and are filtered and preamplified in the respective preamplifier stages 38a and 38b. Electronic switch means 13a and 13b conduct the signals alternately to a common amplifier stage 14, the amplification of which can be remotely adjusted (i.e., from outside the security area) via a device 15, thereby imparting a predetermined level to the output amplifier stage 14, and thereby also adapting the area-security system to existing spatial conditions. Following amplification at stage 14, the respective signals are segregated by electronic switch means 39a and 39b. The control circuit 5 coordinates the electronic switching processes and effects preparation of transient-free electronic pulses at the input of evaluation channels 39a, 39b, all as explained in connection with FIG. 4. An evaluation channel 39a or 39b consists of a sample-and-hold device, a subsequent long-time and short-time integration and a comparator, as explained in connection with FIG. 2. An evaluation (comparator) circuit 40 evaluates the signals obtained, with due consideration of the existing alarm and disturbance criteria. An alarm is indicated by the device 23, and a sabotage or other like disturbance is indicated by the device 27.

Even large-area surfaces can be effectively secured by arranging several transmitter modules and receiver modules alongside of each other.

It can readily be seen that the surface-area security can be used for penetration security (e.g., intruder-alarm protection of a specific area) or for passage security (e.g., intruder-alarm protection of a restricted-passage area which has controlled access to a larger area). Thus, depending upon the locally defined security problem, it is merely necessary to suitably establish the spatial division of the area to be secured, by appropriate selection of the distance between transmitting elements and/or receiving elements.

The area-security system of the invention is also particularly suitable for machine control and/or machine security. The requirements of the professional associations can be satisfied by grouped combination of transmitting elements and receiving elements, and by feeding the group outputs via separate evaluation channels to an evaluation circuit which is developed substantially as an OR-connection. Every influencing of an evaluation channel therefore leads to a corresponding control signal; and the failure of a group of transmitting and/or receiving elements is also indicated.

The described security system can also be used advantageously as a sensor, in particular for the measurement of time and/or speed of moving-body traverse of the security area.

What is claimed is:

1. An area-security system consisting of radiation-transmitting and receiving elements arranged in an area to be secured and producing a report if the radiation is influenced within the secured area, characterized by the fact that along one side of the secured area a transmitting/receiving strip is arranged which is subdivided into transmitting regions and receiving regions, each transmitting region consisting of plural transmitting elements arranged alongside of each other and combined in at least two transmitting groups wherein each transmitting group includes at least one transmitting element of each transmitting region; each receiving region consisting of plural receiving elements which are arranged alongside of each other and are combined in at least two groups of receiving elements arrayed with an intervening transmitting group; a multi-channel evaluation means coupled to evaluate the output signals of the respective receiving elements; and a control circuit connected for alternating excitation of the respective transmitting groups, said control circuit also having a synchronizing connection to said evaluation means for coordinating the evaluation (a) of first-group receiving-element responses to reflections from first-group transmitting-element transmissions and (b) of second-group receiving-element responses to reflections from second-group transmitting-element transmissions, the transmitting and receiving elements having such relatively wide responses within the secured area that, for a sufficiently large reflector in said area, plural first-group receiving elements are responsive to reflections of plural first-group transmitting-element transmissions, to the exclusion of second-group transmitting-element transmissions, and plural second-group receiving elements are similarly responsive to reflections of plural second-group transmitting-element transmissions.

2. An area-security system according to claim 1, wherein a reflection strip is arranged in opposed confronting relationship with the transmitting/receiving strip so that the secured area is defined by and between said strips, whereby said reflection strip enables plural first-group receiving elements to respond to plural first-group transmitting-element transmissions, and also enables plural second-group receiving elements to respond to plural second-group transmitting-element transmissions.

3. An area-security system according to claim 1, wherein said transmitting/receiving strip is one of two in spaced confronting relationship, so that the secured area is defined by and between said strips, there being in said second strip at least two spaced transmission elements respectively connected for excitation with said first-group transmission elements and with said second-group transmission elements, and there also being in said second strip at least two spaced receiving elements respectively coupled to said evaluation means for separate evaluation with the respective responses of said first-group receiving elements and of said second-group receiving elements.

4. An area-security system according to claim 1, characterized by the fact that the transmitting elements are light-emitting diodes and the transmitting elements are subdivided into two groups, the subdivision into groups being such that transmitting elements which are alongside of each other belong alternately to one or to the other group, the control circuit modulating the transmitting elements of one group to emit light pulses in alternation with similar modulation of the transmitting elements of the other group, each of the receiving regions consisting of two receiving elements followed by two evaluation channels, each evaluation channel being associated by the control circuit with a different one of the two groups of transmitting elements, and an alarm being given off only if responses from or to at least two adjacent transmitting elements and/or receiving elements are interrupted for a period of time established by the control circuit, i.e., when both evaluation channels detect an impermissible change in signal.

5. An area-security system according to claim 1, characterized by the fact that the signals of the receiving elements of each group are separately added and that the control circuit successively amplifies the summation signals of the respective receiver groups via a common selective amplifier and that the thus-amplified summation signals are segregated by the control circuit into separate channels, that the segregated signals are separately stored in separate sample-and-hold devices for one time cycle, that behind each sample-and-hold device two integrators with different integration times are connected in parallel and the outputs of the integrators are connected to a comparator of adjustable threshold value, and that in the event of an impermissible influencing of an evaluation channel, the value of the long-time integration can be stored as long as the impermissible influence exists.

6. An area-security system according to claim 1, characterized by the fact that each evaluation channel contains a selective amplifier and a sample-and-hold device, as well as two parallel-connected integrators with different integration times which are connected to the output of the amplifier, and a comparator of adjustable threshold value which is connected to the outputs of the integrators, and that in case of an impermissible influencing of an evaluation channel the value of the long-time integration can be stored as long as the influence exists.

7. An area-security system according to claim 1, characterized by the fact that each evaluation channel uses a sample-and-hold device so controlled by the control circuit as to avoid any sampling of a switching transient.

8. An area-security system according to claim 1, characterized by the fact that a monitoring of the intensity of the emitted and/or received light pulses as well as of the supply voltage takes place, and a report is given in the event that predetermined positive and/or negative threshold values are exceeded.

9. An area-security system according to claim 1, characterized by the fact that a remotely operable arrangement is provided for regulating the pulse current of the transmitting elements and/or for regulating the amplification, so that the received signals have a constant long-time average value at the output of the selective amplifier, and that a report is given when predetermined limit values of the control region are reached.

10. An area-security system according to claim 1, characterized by its use for passage security.

11. An area-security system according to claim 1, characterized by its use for machine security.

12. An area-security system according to claim 1, characterized by its use for penetration security.

13. An area-security system consisting of radiation-transmitting and receiving elements arranged in an area to be secured and producing a report if the radiation is influenced within the secured area, characterized by the fact that along one side of the secured area a transmitting/receiving strip is arranged which is subdivided into transmitting regions and receiving regions, each transmitting region consisting of plural transmitting elements arranged alongside of each other and interposed between at least one receiving element at each end of the arrangement of transmitting elements, said system being further characterized by a second transmitting/receiving strip along an opposing side of the secured area and being similarly subdivided, the transmitting elements of one strip constituting a first transmitting group and those of the second strip constituting a second transmitting group, a multichannel evaluation means coupled to evaluate the output signals of the respective receiving elements, and a control circuit connected for excitation of the respective transmitting groups, said control circuit also having a synchronizing connection to said evaluation means for coordinating the evaluation (a) of first diagonally opposed receiving-element responses to all transmitting-element transmissions in a first period of alternating evaluation and (b) of second diagonally opposed receiving-element responses to transmitting-element transmissions in a second and alternating period of evaluation, the transmitting and receiving elements having such relatively wide responses within the secured area that each receiving element on one strip can respond to the transmissions of all transmitting elements of the second strip.

* * * * *